United States Patent
Ehrlicher

(12) 
(10) Patent No.: US 6,616,321 B2
(45) Date of Patent: Sep. 9, 2003

(54) DEFLECTOR MIXING HEAD FOR REACTION MOLDING MACHINE

(75) Inventor: Stefan Ehrlicher, München (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 10/254,442

(22) Filed: Sep. 25, 2002

(65) Prior Publication Data

US 2003/0053369 A1 Mar. 20, 2003

Related U.S. Application Data

(63) Continuation of application No. PCT/EP01/02671, filed on Mar. 9, 2001.

(30) Foreign Application Priority Data

Mar. 25, 2000 (DE) .......................................... 100 14 972

(51) Int. Cl.$^7$ ............................... B01F 5/04; B29B 7/76
(52) U.S. Cl. .................................... 366/162.5; 422/133
(58) Field of Search ........................... 366/162.5, 162.4, 366/159.1, 167.1, 173.1; 422/133, 134, 135

(56) References Cited

U.S. PATENT DOCUMENTS 4,773,564 A 9/1988 Wallner .................... 366/162.4
5,277,567 A * 1/1994 Bauer et al. ................. 425/130
5,443,797 A 8/1995 Proska et al. ............ 366/162.5
5,785,422 A * 7/1998 Eidenmuller ............. 366/162.5

FOREIGN PATENT DOCUMENTS

| DE | 32 08 696 A1 | 9/1983 |
|---|---|---|
| DE | 32 13 153 A | 10/1983 |
| DE | 29 41 975 A | 12/1985 |
| DE | 40 09 465 A1 | 9/1991 |
| DE | 43 16 380 A | 11/1994 |
| EP | 0 447 883 A | 9/1991 |
| JP | 07 040337 A | 2/1995 |
| JP | 09 131520 A | 5/1997 |

* cited by examiner

*Primary Examiner*—Tony G. Soohoo
(74) *Attorney, Agent, or Firm*—Henry M. Feiereisen; Ursula B. Day

(57) ABSTRACT

A deflector-mixing head for a reaction molding machine, comprises a mixing chamber with a control piston for regulation of component inflow, an overflow chamber is arranged downstream from the mixing chamber in a perpendicular position thereto and provided with a cleaning piston which controls the opening and closing of the mixing chamber side of the inlet of the overflow chamber, wherein an improved mixing quality is obtained by arranging a connection chamber substantially parallel to the axis of the overflow chamber, between the mixing and overflow chambers and provided with deflector elements positioned in the flow path between the inlet and the outlet side of the connecting chamber, and by arranging a displacement piston parallel to the cleaning piston for emptying the connection chamber.

7 Claims, 2 Drawing Sheets

# DEFLECTOR MIXING HEAD FOR REACTION MOLDING MACHINE

CROSS-REFERENCES TO RELATED APPLICATIONS

This application is a continuation of prior filed copending PCT International application no. PCT/EP 01/02671, filed Mar. 9, 2001.

This application claims the priority of German Patent Application Serial No. 100 14 972.3, filed Mar. 25, 2000, pursuant to 35U.S.C. 119(a)–(d), the content of which is incorporated herein by reference.

FIELD OF THE INVENTION

The present invention relates to a deflector mixing head for a reaction molding machine and in particular to a mixing head configured for improved mixing and homogenization of the mixing components in reaction systems, even for hard-to-mix systems.

BACKGROUND OF THE INVENTION

From DE 32 08 696 A1, a linear mixing head is known, where the reaction components flow in through impact valves which are disposed diametrically above each other and the components flow past damming bodies prior to reaching the mold cavities which are disposed immediately downstream from the mixing chamber in order to realize a throttle effect and an improved mixing effect.

In order to obtain an essentially homogenized component mixture, other deflector mixing heads that are known, for example from DE 40 09 465 A1, are configured such that an overflow chamber which acts as a slowing-down zone is disposed downstream from and positioned at an angle relative to the mixing chamber, where the overflow chamber is divided into two single chambers that are likewise positioned at an angle relative to each other, to thereby realize an additional deflection of the mixture, or alternatively, as in the afore-described deflector mixing head, a reversible cleaning piston is disposed in the overflow chamber in order to attain a reduction of the mixture flow at the mixing chamber side of the inlet opening of the overflow chamber for a simultaneously deflection of the mixture, which can be adjusted. Such deflector mixing heads are generally used and fully sufficient for use with a majority of reaction systems that are utilized. However, it is in the hard-to-mix-systems where localized inhomogeneous mixtures occur that are causing problems and that are also not acceptable on the basis of quality considerations.

From DE 32 13 153 A1, a mixing head is known, where the mixing chamber and the overflow chamber are arranged relative to each other in axis-parallel relationship. Between the mixing chamber and the overflow chamber and transverse to their axes overflow apertures are provided through which the reaction mixture can flow from the mixing chamber to the overflow chamber. An improvement of the mixing degree can be realized when throttle members are driven in and out of the overflow apertures.

From the generic patent U.S. Pat. No. 5,443,797, a deflector mixing head is known in accordance with the preamble of claim 1. This deflector mixing head exhibits drawbacks that are identical to those as stated in connection with DE 4009 465. In systems of hard-to-mix components, localized inhomogeneous mixing condition can occur in the same manner as in with the deflector mixing head of U.S. Pat. No. 5,443,797, which are for reason of quality assurance unacceptable.

It would therefore be desirable and advantageous to provide an improved deflector mixing head to obviate prior art shortcomings and to provide a deflector mixing head of a simple construction and with which highly homogenized mixtures can be realized even in hard-to-mix reaction systems.

SUMMARY OF THE INVENTION

According to one aspect of the present invention, a deflector mixing head is provided capable to achieve a high degree of homogenization of reaction components, in particular also with hard-o-mix reaction systems.

The deflector mixing head according to the present invention comprises a mixing chamber with an inlet valve and a control piston for regulating an inflow of components, an overflow chamber arranged downstream from and in perpendicular position to the mixing chamber, a cleaning piston for controlling an opening and closing of a mixing chamber inlet side of the overflow chamber, a connection chamber in substantially axially parallel position to the overflow chamber and disposed between the mixing chamber and overflow chamber, said connecting chamber is provided with deflector elements positioned in a flow path between the inlet and an outlet side of the connecting chamber and provided with a displacement piston disposed parallel to the cleaning piston to be lifted for allowing emptying the connection chamber.

According to one feature of the invention an additional intensive mixing effect can be realized by means of providing an intermediate connecting chamber of a particular configuration which is positioned between the mixing chamber and the overflow chamber. The disposition of a connecting chamber provides for additional multiple dividing and re-mixing of the mixture flow which takes place at the juncture of the deflecting elements and ensures that even the hard-to-mix reaction components are worked into a homogenized reaction mixture. Furthermore, an essential aspect of the deflector mixing head according to the present invention that after the constant flow of homogenized mixture, the connection chamber is completely emptied by means of the displacement piston at the end of the shot, so that when operating in conjunction with the control piston and the cleaning piston all remaining residue has been cleared from the mixing head.

In a preferred embodiment of the invention and in order to improve the degree and quality of mixing the components, the flow path of the mixture is extended by means of providing a correspondingly enlarged number of deflecting elements and by universally encasing the overflow chamber by the connecting chamber, which is connected to the mixing chamber at an inlet side on the side opposite the side of the overflow chamber.

In a further especially preferred embodiment of the invention, the connecting chamber is so configured as to terminate in an annular gap, which is variably adjustable by means of a cleaning piston and the flow of the reaction components can thus be homogeneously mixed at the deflecting elements positioned in the circumferential direction of the annular gap. This configuration ensures on the one hand a highly stabilized laminar discharge and on the other hand, the possibility to adapt the reduced flow effect of the annular gap individually to a particular mixture.

In another especially preferred embodiment, the shear effect of the deflector mixing head is variably adjustable and thus the flow diameter of the connecting chamber is adjustable by means of a corresponding lifting position of the displacement piston so that the high shear forces necessary for a good mixing effect can be adjusted in correspondence to keeping the size of the diameter of the connecting chamber small by lowering the displacement piston, while on the other hand, when lifting the displacement piston and the flow diameter of the connecting chamber is thus enlarged, the shear effect becomes very small, which ensures that even the very shear-sensitive reaction mixtures can be treated gently but at the same time are subjected to a thorough mixing action.

In yet a further preferred embodiment of the invention and in particularly simple manner, the deflecting elements which are secured with the displacement piston in a fixed manner are received with a bearing and sealing fit in corresponding receiving bores disposed at the delimiting wall of the connection chamber opposite the displacement piston.

In order to allow a most homogeneous flow of the component mixture through the connecting chamber, a number of diverting elements are provided extending from the entry side to the exit side of the connection chamber and which are configured as a number of mixing pins of varying diameters positioned in such a manner, such that the mixing pins are placed offset and in staggered position corresponding to their diminishing diameters.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
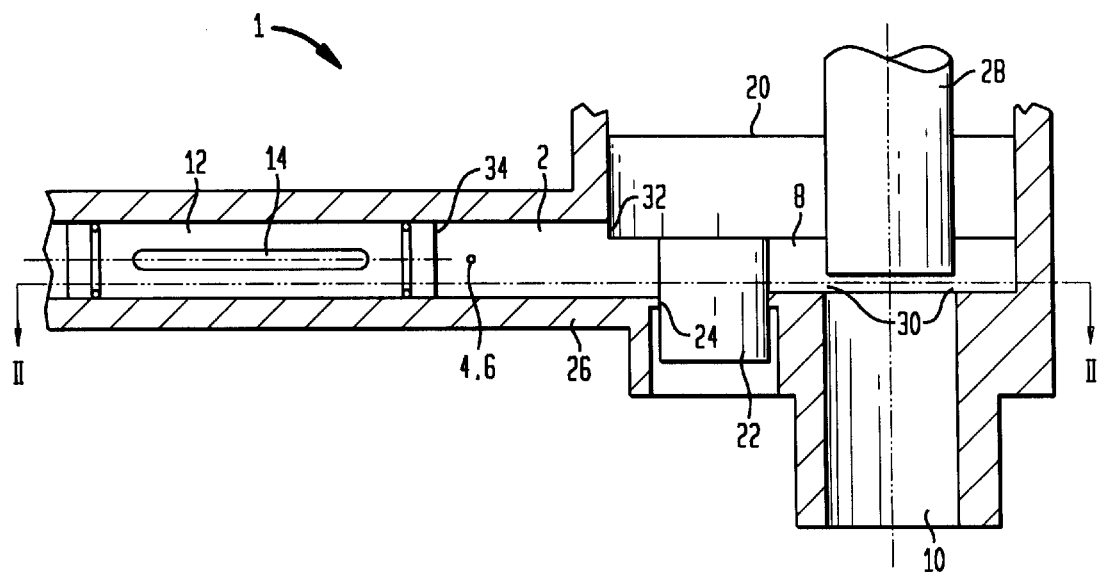
FIG. 1 is a longitudinal section of a deflector mixing head in the shot phase according to the present invention.

Throughout all the Figures, same or corresponding elements are generally indicated by same reference numerals.

Figure 2:
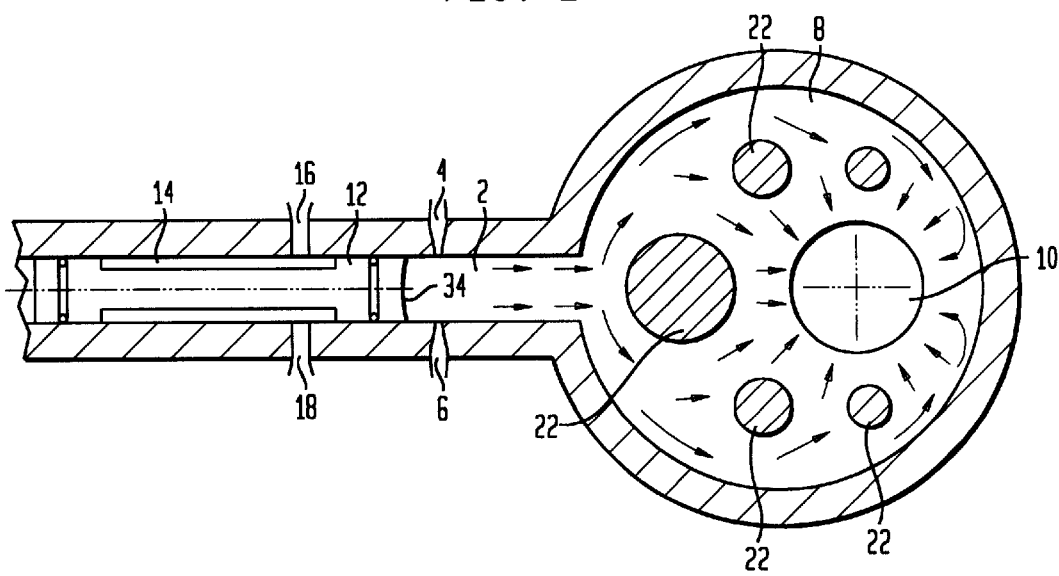
FIG. 2 is a section of a deflector mixing head according to FIG. 1 along line II—II.
Figure 3:
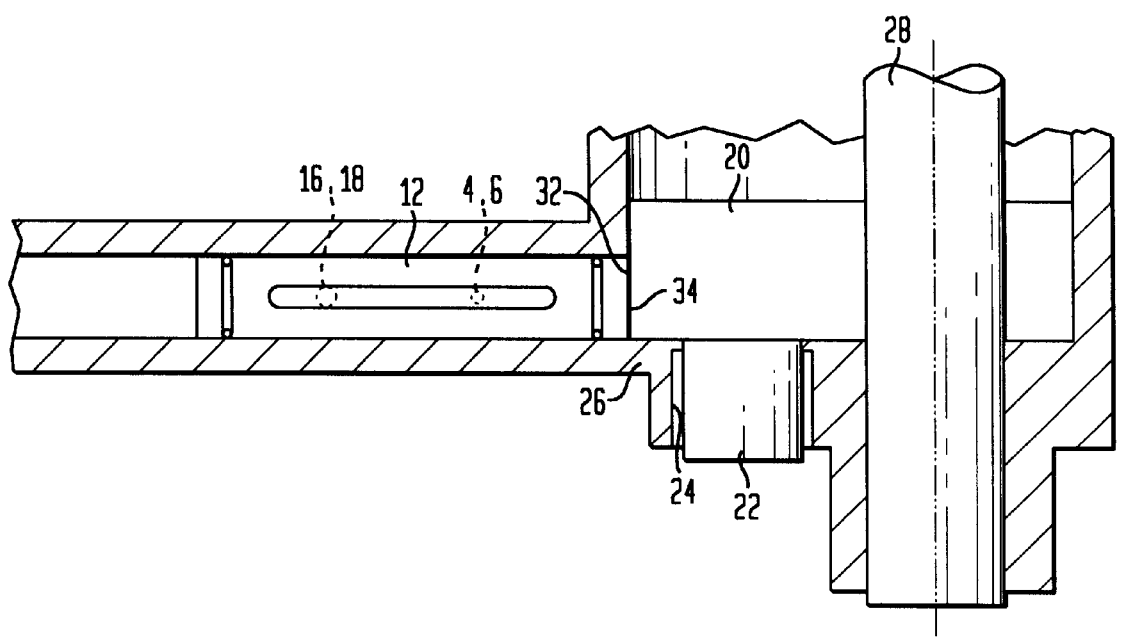
FIG. 3 is an illustration of a deflector mixing head in the cleaning phase.

Turning now to the drawings, the deflector mixing head generally indicated by reference numeral 1 shown in FIGS. 1–3 comprises a mixing chamber 2 with the reaction components flowing by way of a deflecting mixture through inlet valves 4, 6 arranged above each other in diametrically opposing disposition, and adjacent the mixing chamber 2, a connecting chamber 8 with a center axis extending at a 90 degree angle to the axis of the mixing chamber; and an overflow chamber 10 positioned downstream of the connecting chamber at the side opposite the mixing chamber 2 and in axially parallel disposition relative to the connecting chamber 8 and universally encased by the connecting chamber 8.

In FIG. 1, there is further shown a deflector mixing head where the in-flow of the mixing components is controlled by a control piston 12 disposed in the mixing chamber 2, which control piston is movable by a piston stroke and during the shot phase the control piston is in the back stroke position thereby exposing the inlet valves 4, 6. After the end of the shot, the control piston 12 is driven to the frontal end position as seen in FIG. 3, whereby the mixing chamber 2 becomes entirely cleared of mixing components and the inlet valves 4, 6, are brought into to communicating connection with the corresponding re-circulation apertures 16, 18 of mixing chamber 2 via re-circulation channels 14 in the control piston 12.

Connecting chamber 8 is delimited by a displacement piston 20 operating in piston stroke manner. A number of deflecting elements 22 which are in the form of cylindrical mixing pins are secured to the displacement piston and are engaging in a tight bearing and sealing fit in corresponding receiving bores 24 at the delimiting wall 26 of the connection chamber 8 opposite the displacement piston 20.

The cleaning piston 28 associated with overflow chamber 10 and whose piston stroke can be controlled separately from the displacement piston, penetrates the displacement piston in sealing manner and together with the inlet end of the overflow chamber 10 delimits the annular gap 30, the gap size of which is variably adjustable by means of the stroke position of the cleaning piston 28.

As is indicated by the directional arrows in FIG. 2, the flow of the mixing component is being divided in multiple ways at the inlet valves 4, 6 by means of the mixing pins 22 and then reunited, whereby the component flow is thoroughly mixed and at the same time evenly distributed essentially in radial flow direction and in circumferential direction of the annular gap 30. This mixing activity is realized through the positioning of the mixing pins 22 in such a manner that in flow direction the mixing pins 22 are arranged in staggered position and in dependence on their diminishing diameters.

The reaction mixture which flows through the annular gap 30 is deflected in axial direction into the overflow chamber 10 and from there the mixture is delivered as a laminar steady discharge into the downstream cavities.

In addition to adjusting the flow reduction at the annular gap 30 in a variable manner, flow reduction of the mixing chamber 2 can be realized by means of adjusting the lifting action of displacement piston 20, namely at the flow edge 32 of the displacement piston 20, whereby the flow-through capacity and the corresponding shear effect in the area of the connecting chamber 8 are simultaneously changed. Thus, the displacement piston 20 can be adjusted for an extremely shear-sensitive reaction system to the upper lifting position which is commensurate with a very large flow-through capacity of the connecting chamber 8, whereas for a system, which requires high shear forces for a good mixing quality, the flow-through capacity of the connecting chamber 8 can be selected to be very small.

The end of the shot phase is followed by the cleaning phase, in which the control piston 13 is first moved into the position as shown in FIG. 3 to thereby completely empty the mixing chamber 2. Thereafter the displacement piston 20 is moved to the stop at the delimiting wall 26 in a form-fitting abutment of the streaming edge 32 at the front end of control piston 12, until the discharge of the mixture from connecting chamber 8 and the overflow chamber have subsequently been emptied, so that at the end of the cleaning phase (FIG. 3) no residue remains. Due to the unencumbered access of the component mixture to the mixing pins 22 eventually occurring leakage of the mixture at the receiving bores 24 can be easily removed from the exterior of the device.

While the invention has been illustrated and described as embodied in a deflector mixing head, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A deflector mixing head for a reaction molding machine comprising a mixing chamber with an inlet valve and a control piston for regulating inflow of components, an overflow chamber arranged downstream from and in perpendicular position to the mixing chamber, a cleaning piston for controlling opening and closing of a mixing chamber inlet side of the overflow chamber, a connecting chamber in substantially axially parallel position to the overflow chamber and disposed between the mixing chamber and overflow chamber, said connecting chamber is provided with deflector elements positioned in a flow path of a component mixture between the inlet and an outlet side of the connecting chamber and provided with a displacement piston disposed parallel to the cleaning piston to be lifted for emptying the connection chamber.

2. The deflector mixing head of claim 1, wherein the connecting chamber is configured for encasing the overflow chamber in a universal manner and coupled to the mixing chamber at an inlet side opposite a side of the overflow chamber.

3. The deflector mixing head of claim 1, wherein the connecting chamber terminates in the overflow chamber via an annular gap which is variably adjustable by means of the cleaning piston, and wherein the flow of component mixture is evenly distributed at the deflector elements in circumferential direction of the annular gap.

4. The deflector mixing head of claim 1, wherein the displacement piston is variably adjustable in the lifting direction of the piston for controlling the flow diameter of the connecting chamber.

5. The deflector mixing head of claim 1, wherein the deflecting elements are secured in a fixed manner to the displacement piston and received with a bearing and sealing fit in corresponding receiving bores disposed at the delimiting wall of the connection chamber opposite the displacement piston.

6. The deflector mixing head of claim 1, wherein the deflecting elements are secured in a fixed manner to the displacement piston and configured with decreasing diameter as their numbers increase from the inlet to the outlet side of the connecting chamber and arranged in an offset staggered pattern.

7. The deflector mixing head of claim 1, wherein the diameter of one of the deflecting element disposed in front of the mixing chamber is larger that the diameter of the mixing chamber.

* * * * *